July 31, 1962 A. M. SPRINGER 3,047,673

ROTATABLE MAGNETIC SYSTEMS FOR TRANSFORMING AUDIO CURRENTS

Original Filed Oct. 29, 1956 3 Sheets-Sheet 1

INVENTOR:

Anton Marian Springer
by Erwin Salzer
Atty.

July 31, 1962 A. M. SPRINGER 3,047,673

ROTATABLE MAGNETIC SYSTEMS FOR TRANSFORMING AUDIO CURRENTS

Original Filed Oct. 29, 1956 3 Sheets-Sheet 2

INVENTOR:

Anton Marian Springer by Erwin Salzer

Atty.

INVENTOR:

Anton Marien Springer
by Erwin Salzer
Atty.

3,047,673

ROTATABLE MAGNETIC SYSTEMS FOR TRANSFORMING AUDIO CURRENTS

Anton M. Springer, Homburg vor der Hohe, Germany, assignor to Telefonbau und Normalzeit G.m.b.H., Frankfurt am Main, Germany, a German firm Original application Oct. 29, 1956, Ser. No. 618,766, now Patent No. 3,022,383, dated Feb. 20, 1962. Divided and this application Jan. 7, 1958, Ser. No. 707,628
10 Claims. (Cl. 179—100.2)

This is a division of application Ser. No. 618,766, filed October 29, 1956, for Rotatable Magnetic Systems for Transforming Audio Currents, now Patent No. 3,022,-383, issued February 20, 1962.

It is one object of this invention to provide improved playback heads making it possible to change, i.e. to accelerate or decelerate, the speed of reproduction or playback of audio records without changing the pitch of the sounds involved.

It is another object of the invention to provide a device capable of reproducing records of speech, or music, at a more rapid, or less rapid, speed than that at which the original record thereof was made, without affecting the pitch, and other tonal qualities, of the sounds involved. Devices of this character may be used by stenographers for reducing the speed of play back of dictation relative to the speed of the original dictation, or to facilitate the understanding of speech in foreign languages by reducing the speed of playback. Acceleration of reproduction may be desired in cases where the skill of musicians is not sufficient to keep pace with exacting speed requirements. Devices for changing the speed of playback of sound are also needed for synchronizing sound films, as necessary where sound has been recorded separately from the motion picture. Another very important application of transforming audio currents with a view to change the speed of reproduction without changing the tonal qualities of the record is the broadcasting of intelligence and of music where it is often desired to compress, or to stretch, the time of playback of a given record.

In order to reproduce the tonal qualities of a record with a high degree of fidelity, the relative velocity between the playback head, which may be a magnetic head, where magnetic tape with a sound track thereon is being used for recording sound, and the record must be the same as the relative velocity between the recording head and the record at the time the original record is being made. A change of a few percent of the relative speed at reproduction in regard to the relative speed at original recording changes the tonal qualities of the reproduction so drastically as to make it impossible to even recognize a well known voice. A change in the speed of reproduction or playback can be achieved by maintaining, during reproduction of a sound record, the relative velocity between reproducing head and record exactly the same as the relative velocity between recording head and record during the original recording operation, but increasing or decreasing, as the case may be, the absolute velocity at which the record is being moved. An increase of the absolute velocity of the record results in shortening, and a decrease of the absolute velocity of the record results in lengthening, of the time required for reproducing a given sound record. Varying the absolute velocity of a record at will while maintaining a predetermined relative velocity between reproduction head and record calls for electro-acoustic systems having rotatable multiple playback heads, e.g. multiple magnetic playback heads.

It is one object of this invention to provide improved electro-acoustic playback systems of the aforementioned character, and more particularly to provide such systems having improved rotatable multiple magnetic playback heads.

Where the absolute velocity of a record is being increased to shorten the time of playback, and the relative velocity between reproduction head and record is maintained at a given value to maintain the pitch of the sounds involved, certain increments of the sound track are being periodically omitted, or deleted. Similarly, where the absolute velocity of a record is being decreased to lengthen the time of playback, periodic increments of the sound track are being repeated, i.e. played twice, during reproduction of the record. The shortest audible sound is a sound whose duration is 40 milliseconds. The duration of the increments on the sound track which are being deleted, or repeated, as the case may be, must be less than 40 milliseconds, to preclude these deletions or repetitions from being noticed. Considering a magnetic tape moving at a velocity of 76 cms. per sec., the distance between two adjacent magnetic heads of a multiple magnetic reproduction head, i.e. the distance between the pole gaps thereof, must be 31 millimeters to comply with the requirement that the increments of the sound track deleted, or repeated, during playback not exceed 40 milliseconds. At a tape velocity of 38 cms. per second the distance between adjacent pole gaps of a rotatable multiple magnetic reproduction head must be as small as 15.5 millimeters, and at a tape velocity of 19 cms. per second the distance between adjacent pole gaps of a rotatable multiple magnetic playback head must be as small as 7.75 millimeters. It is very difficult and expensive to manufacture rotatable multiple reproduction heads having an excessively small spacing between the individual constituent playback heads thereof.

It is, therefore, another general object of this invention to provide improved electro-acoustic reproduction systems of the aforementioned character having rotatable multiple playback heads which lend themselves to be readily manufactured at relatively small cost, however narrow the spacing between adjacent individual playback heads or pole gaps may be.

In the preferred embodiments of this invention the sound record is in the form of magnetic tape with a sound track thereon, and the play back head a magnetic head.

It is, therefore, a special object of this invention to provide improved tape playback systems having rotatable multiple magnetic playback heads which lend themselves to be readily manufactured at relatively small cost, however narrow the spacing between adjacent poles or air gaps thereof may be.

An important problem in connection with playback speed control systems of the aforementioned character is the nature of the drive thereof. The constant relative speed of the sound record relative to the playback head can readily be achieved by driving the latter by means of a motor having a constant number of revolutions, e.g. a synchronous motor. Such a motor is one of several available types of motors having a constant relative velocity between rotor and stator. To achieve the speed control required for varying the absolute velocity of the sound record, the stator of the synchronous motor may be driven by an auxiliary motor and an intermediary gear having a variable gear ratio, the rotatable stator being used to drive the sound record. As an alternative, the rotatable stator of a synchronous motor may be coupled with, and driving, a multiple playback head, and the rotor coupled with, and driving, a capstan for advancing a magnetic tape, in which case the rotor will be driven by an auxiliary motor and intermediate gears having a variable gear ratio.

It is a further object of this invention to provide improved playback speed control systems comprising a synchronous motor, or other motor having a fixed relative velocity between rotor and stator, whose stator drives the multiple playback head and whose rotor drives a sound record and is being driven by an auxiliary motor by the intermediary of a variable speed drive, i.e. a transmission having a variable gear ratio.

It is a further special object of this invention to provide improved magnetic tape playback systems comprising an electric motor having a stator driving a multiple magnetic playback head and a rotor driving a capstan engaging magnetic tape and advancing the same at predetermined speeds wherein the rotor of the synchronous motor is being driven by an auxiliary motor by the intermediary of a variable speed drive.

It will be understood that the terms rotor and stator which have been used in the foregoing because their use is conventional in the art for designating the two parts of an electric motor, such as a synchronous motor, have lost their original significance in the present context inasmuch as the stator is not a static but a rotatable part used to drive the multiple magnetic playback head, or other multiple rotatable sound reproduction head.

A further object of the invention is to provide improved magnetic tape playback systems having an electric drive of the aforementioned character or, in other words, an "electrical differential" of the aforementioned character, which drive has a high degree of stability, and whose magnetic leakage flux does not tend to produce noise in the rotatable multiple magnetic playback head.

Other object and advantages of the invention will become apparent as this specification proceeds, and the features of novelty which characterize the invention will be pointed out with particularity in the appended claims forming part of this specification.

For a better understanding of the invention reference may be had to the accompanying drawings in which:

FIG. 1 is an isometric view of an electro-acoustic playback system embodying the invention;

FIG. 1*a* is a top plan view of a rotatable multiple magnetic playback head such as used in the structure of FIG. 1;

Figure 1:
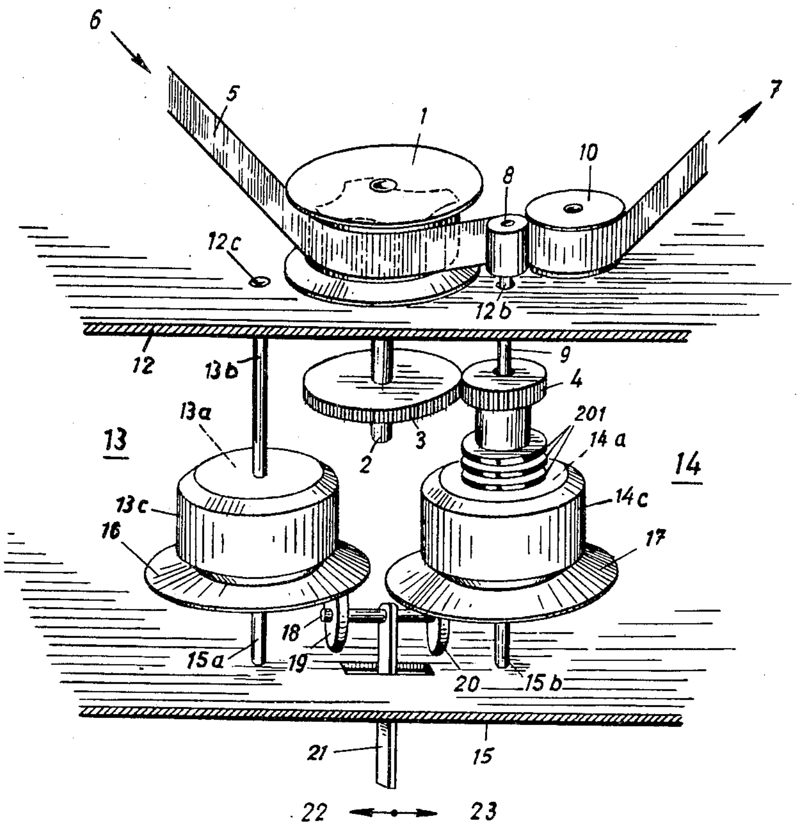
Figure 10:
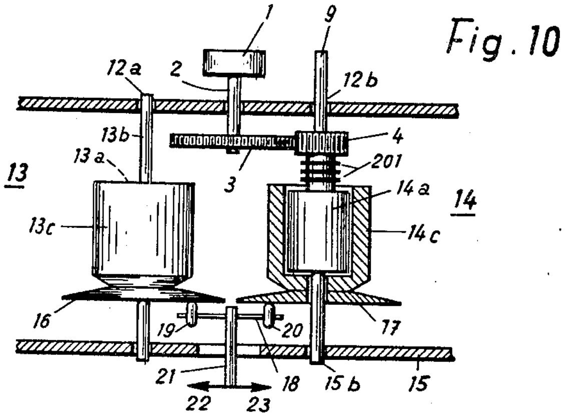
FIG. 10 is a side elevation of substantially the same drive means for a rotatable magnetic playback head and for magnetic tape as shown in FIG. 1.

Referring now to the drawings, and more particularly to FIGS. 1 and 10 thereof, reference character 1 has been applied to generally indicate a rotatable multiple magnetic playback head. The structural details of playback head 1 are shown in FIGS 1*a* to 8, inclusive, and will be described in connection with these figures. Magnetic playback head 1 is driven by shaft 2. Gear 3 is fixedly mounted on shaft 2 and driven by gear 4. Magnetic tape 5 is wound along a predetermined angle around the cylindrical surface of magnetic playback head 1, and moves in the direction of arrows 6 and 7 from a supply reel (not shown) on the left to a take up reel (not shown) on the right of FIGURE 1. The tape drive comprises capstan 8 fixedly mounted on driving shaft 9 parallel to driven shaft 2, and the pressure roller 10. The tape drive further includes a pair of synchronous motors generally indicated by reference numerals 13 and 14. The axes of rotation and the shafts of motors 13 and 14 are arranged parallel to each other, and parallel to the driving shaft 2 of magnetic playback head 1. Motors 13 and 14 are arranged between a pair of parallel plates 12 and 15 forming part of a mounting frame structure or chassis. Synchronous motor 14 comprises the rotor 14*c* mounted on, or coupled with, shaft 9 supported in bearings 12*b* and 15*b* provided in plates 12 and 15, and stator 14*a*. Friction plate 17 is arranged coaxially with respect to rotor 14*c* and stator 14*a* and fixedly mounted on the former for joint rotation therewith. Synchronous motor 13—which is an auxiliary motor—comprises the rotor 13*c* mounted on shaft 13*b* supported in bearings 12*c* and 15*a* in frame plates 12 and 15. Motor 13 further comprises the stator 13*a* fixedly mounted on the chassis, whereas stator 14*c* of motor 14 is rotatable about shaft 9, and thus adapted to rotate relative to chassis plates 14, 15. Friction plate 16 is arranged coaxially with respect to rotor 13*a* and stator 13*c*, and fixedly mounted on the former the joint rotation therewith. Shaft 18 supporting friction rollers 19, 20 is supported by a bearing rod 21 adapted to be shifted selectively either to the left, or to the right, as indicated by the arrows 22 and 23. Shaft 18 is arranged at right angles to shafts 9 and 13*b*, and rollers 19 and 20 are in frictional engagement with friction plates 16, 17, and thus adapted to transmit the rotary motion of rotor 13*c* of motor 13 to the rotor 14*c* of motor 14. Shifting of lever 21 to the left or right, as the case may be, permits a continuous change of the gear ratio of transmission 16, 19, 18, 20 and 17, and hence a continuous change of the angular velocity at which rotor 14*c* is being driven by rotor 13*c*. Gear 4 driving gear 3 on the shaft 2 of playback head 1 is fixedly mounted on stator 14*a* for joint rotation therewith.

Since the relative angular velocity between the stator since playback head 1 is being driven by the stator 14*a* and capstan 8 is being driven by the rotor 14*c* of synchronous motor 14, the relative velocity between the surface of playback head 1 and the magnetic tape 5 will be constant. The absolute velocity of tape 5 depends upon the angular velocity of capstan 8 which, in turn, depends upon the angular velocity of rotor 14*c*. The latter velocity depends, in turn, on the gear ratio of transmission 16, 19, 18, 20 and 17 which can be changed continuously to achieve either decelerated, or an accelerated playback, as desired.

For a more complete disclosure of the structural features of playback head 1 reference ought to be had to FIGS. 1*a* to 8, inclusive.

Figure 1A:
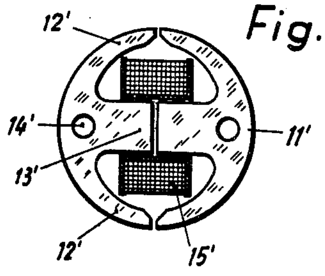
Figure 2:
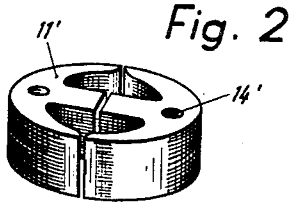
FIG. 2 is an isometric view of the structure shown in FIG. 1*a*.

Referring now to FIGS. 1*a* and 2, the multiple playback head shown therein comprises a substantially cylindrical magnetic core structure made up of a pair of substantially U-shaped stacks 11′ of laminations of a magnetic material. The cross-sectional area of inner core portion 13′ is relatively large, and the cross-sectional area of the outer core portions 12′ decreases progressively toward the air gaps formed therebetween. The juxtaposed ends of outer core portions 12′ are separated by relatively narrow gaps and form the pole pieces of the magnet system. Each stack of laminations 11′ is provided with a transversal bore 14′ intended to receive a rivet firmly joining the individual laminations together so as to form a solid stack. The magnet coil 15′ may either be self-supporting, or wound upon an insulating bobbin, as shown. The upper and lower surfaces of the core structure 11′ shown in FIGS. 1*a* and 2 are supposed to be provided with appropriate supports permitting core structure 11′ to be rotatably mounted (upon shaft 2, as shown in FIG. 1).

When assembling the multiple playback head shown in FIGS. 1a and 2, both core structures 11′ are initially separated and then moved from opposite sides into magnet coil 15′.

The cylindrical surfaces of core structures 11′ are intended to support, or guide, the magnetic tape, as clearly shown in FIG. 1.

It will be apparent from a consideration of FIGS. 1, 1a and 2 that the two magnetic cores 11′ define a pair of magnetic flux paths each having a pole gap arranged substantially in a cylindrical surface situated coaxially with respect to the driving shaft 2 of the playback head, and that both flux paths link with substantially all turns of magnet coil 15′. It is this single coil feature which makes it readily possible to manufacture rotatable multiple playback heads having small spacings between pole gaps without the need of resorting to excessive miniaturization.

Figures 3, 4, 5:
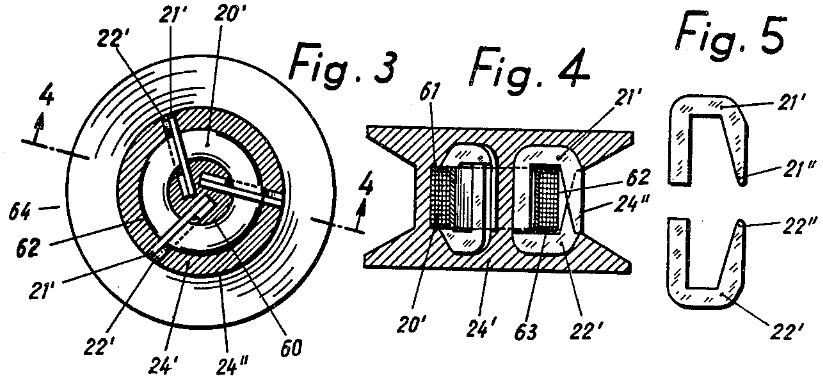
FIG. 3 is a top plan view of a rotatable magnetic playback head comprising six pole pieces forming three magnetic gaps.
FIG. 4 is a section along 4—4 of FIG. 3.
FIG. 5 is a side elevation of the magnetic laminae forming the poles of the structure shown in FIGS. 3 and 4.

Referring now to FIGS. 3 to 5, inclusive, the structure shown therein comprises a coil 20′ in the shape of a toroid intended to be arranged coaxially with respect to the driving shaft of the playback head (part 2 shown in FIGS. 1 and 10). The multiple playback head shown in FIGS. 3 and 4 comprises three individual playback heads which are angularly displaced 360/3 deg.=120 deg. Each of the three flux paths of the playback head is made up of a pair of substantially U-shaped ferro-magnetic elements 21′, 22′, shown per se in FIG. 5, engaging magnet coil 20′ in the fashion clearly shown in FIGS. 3 and 4. The three substantially U-shaped angularly displaced magnetic elements 21′ engage the radially inner surface 60, the upper surface 61 and the radially outer surface 62 of coil 20′. The three substantially U-shaped angularly displaced magnetic elements 22′ engage the radially inner surface 60, the lower surface 63 and the radially outer surface 62 of coil 20′. Magnetic elements 21′ and 22′ form a plurality of pole pieces 21″ and 22″, respectively. These pole pieces are arranged outside coil 20′ in a cylindrical surface coaxial with respect to coil 20′ and the shaft (indicated by reference numeral 2 in FIGS. 1 and 10) supporting all the constituent parts of the playback head. Each of the pole pieces 21″ and 22″ and all of the pole gaps formed between immediately adjacent pole pieces extend substantially along a generating line of the cylindrical surface in which the pole pieces and the pole gaps are situated. Reference numeral 24′ has been applied to indicate a body of a non-magnetic material, e.g. a synthetic resin, wherein the toroidal coil 20′ and the core structure 21′, 22′ are embedded. Body 24′—which may be a casting—has a cylindrical surface 24″ around which the magnetic tape having a sound track thereon is supposed to be wound. The cylindrical surface 24″ formed by non-magnetic body 24′ is substantially coextensive with the cylindrical surface wherein pole pieces 21″ and 22″ are arranged. It will be apparent from the foregoing that the magnetic core structure 21′, 22′ forms a plurality of magnetic flux paths, i.e. three magnetic flux paths, each linking with all the turns of central coil 20′.

The magnetic playback head 1 is not provided with any shielding means for protection against the action of magnetic fields other than those produced by the magnetic tape 5 in cooperative engagement with the playback head. It was found that provision of magnetic shielding means is neither necessary, nor feasible. The gap formed between pole pieces 21″ and 22″ is in the order of .02 millimeter. A non-magnetic filler ought preferably to be provided in the gap formed between the pole pieces of rotatable multiple playback heads embodying this invention, irrespective of the specific embodiment thereof which is being applied.

Figures 6, 7, 8:
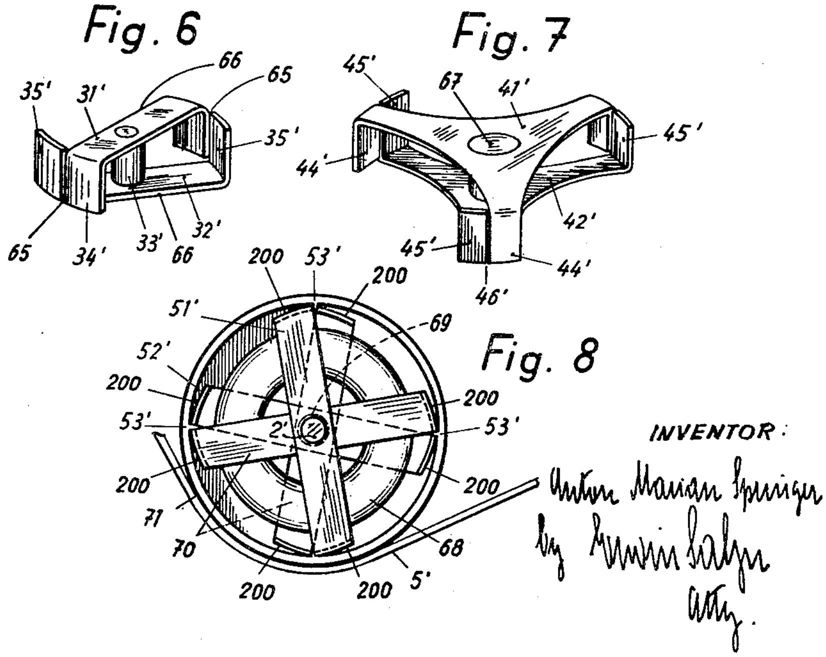
FIG. 6 is an isometric view of the magnetic core structure of a dual magnetic playback head embodying the invention, the magnetizing winding being omitted in this figure.
FIG. 7 is an isometric view of the magnetic core structure of a triple magnetic playback head embodying the invention, the magnetizing winding being likewise omitted in this figure.
FIG. 8 is a top plan view of a rotatable magnetic playback head embodying this invention comprising four pairs of spaced pole pieces forming four magnetic gaps.

Referring now to FIG. 6, the magnetic core structure shown therein comprises two channel-shaped magnetic elements 31′ and 32′. The web portions of magnetic elements 31′ and 32′ engage the upper and lower ends of the cylindrical core member 33′. The latter is supposed to be surrounded by a coaxial toroidal magnet coil (not shown), and supported by a coaxial head driving shaft (not shown). The flange portions 34′ of channel element 31′ and the flange portions 35′ of channel element 32′ are arranged in a cylindrical surface substantially coaxial to the outer surface of the toroidal magnet coil supposed to surround core member 33′. Flange portions 34′, 35′ are spaced to form a system of relatively narrow gaps 65, each situated between two of a system of relatively wide gaps 66. The magnetic tape 5 (shown in FIG. 1) having a sound track thereon is supposed to be wound around a predetermined portion of the periphery of the cylindrical surface wherein flange portions 34′ and 35′ are arranged. The core member 33′ and the two channels 31′ and 32′ form a magnetic core structure having a plurality of flux paths of magnetic material linking with all the turns of the toroidal magnet coil supposed to surround core member 33′. The structure shown in FIG. 6 may be embedded in a coaxial body of non-magnetic material, e.g. a synthetic resin, as described in connection with FIGS. 3 to 5, to provide an appropriate cylindrical surface around which the magnetic tape can be wound and by which it can be supported, as shown in FIG. 1. As an alternative, the aforementioned body of non-magnetic material may be omitted, and a plurality of circular discs of non-magnetic sheet material may be substituted for it, the discs forming an integral part of the rotatable multiple magnetic playback head.

The structure shown in FIG. 7 is substantially the same as that of FIG. 6, except that the former has three pairs of poles and three pole gaps, and the latter but two pairs of poles and two pole gaps. The structure shown in FIG. 7 comprises a top plate 41′ and a bottom plate 42′ and a cylindrical core member 67 providing a path of small reluctance between plates 41′ and 42′. Plate 41′ forms three magnetic arms having a predetermined geometrical configuration in engagement with the top surface of core member 67′ and extending radially outwardly therefrom. Plate 42′ forms three magnetic arms having the same predetermined geometrical configuration as the arms formed by plate 41′. The arms formed by plate 42′ are in engagement with the bottom surface of core member 67′, and extend radially outwardly therefrom. The arms formed by plates 41′ and 42′ are angularly displaced to each other, and hence out of registry. Each of the arms formed by plates 41′ and 42′ is provided with a pole piece 44′ and 45′, respectively. A toroidal magnet coil (not shown) coaxial with core member 67 is supposed to be arranged in the space which is radially inwardly bounded by core member 67 and radially outwardly bounded by pole pieces 44′ and 45′. The pole pieces 44′ and 45′ define a cylindrical surface coaxial with respect to core member 67, and each pole piece includes a substantially rectangular portion of said cylindrical surface. To be more specific, the juxtaposed edge portions of immediately adjacent pole pieces 44′, 45′ form pole surfaces, and bound pole gaps, all situated in a cylindrical surface coaxial with respect to the core member 67 (and the toroidal magnet coil, and the head-supporting shaft not shown in FIG. 7). The magnetic tape cooperating with the rotatable magnetic playback head shown in FIG. 7 will be guided by cylindrical tape guiding means of the same nature as described in connection with FIGS. 3 to 6, inclusive.

The rotatable magnetic playback head shown in FIG. 8 is of the same nature as that shown in FIGS. 6 and 7, yet the playback head shown in FIG. 8 comprises a larger number of pole gaps, i.e. four such gaps. Reference numeral 2′ has been applied to indicate the driving shaft of the playback head. Core member 69 is arranged inside of toroidal coil 68 in coaxial relation to shaft 2′ and coil 68. Reference numeral 51′ has been applied to indicate a plurality of channels of magnetic material arranged in substantially the same fashion as the channels in the structure of FIG. 6. The flange portions 200 of the channel members shown in FIG. 8 enclose an angle other than 90 degrees with the longitudinal planes of symmetry of the web portions, as a result of which each immediately adjacent pair of flange portions 200 encloses an obtuse angle. By virtue of this specific geometry the edges of the web portions remote from the edges forming the pole gaps 53 are rendered magnetically ineffective. Reference numeral 71 has been applied to indicate a cylindrical surface formed by a body of non-magnetic material, such as an appropriate synthetic resin. Surface 71 is intended to engage and guide the magnetic tape 5′ intended to be played back.

Assuming a magnetic tape to be moved at a velocity of 9.5 centimeters per second. The requirement that the portions of the sound track to be repeated, or omitted, as the case may be, not exceed 40 milliseconds makes it necessary to provide a spacing of 3.8 millimeters between the pole gaps of the rotatable multiple playback head. If the playback head has but two pole gaps, as shown in FIGS. 1*a* and 6, the diameter of the playback head is barely 2.5 millimeters. Since it is not indicated to have playback heads of extremely small size it is desirable to increase the number of pairs of poles and pole gaps, as shown in FIGS. 7 and 8.

It will be apparent that the projections 34′, 35′ of the structure of FIG. 6, the projections 44′, 45′ of the structure of FIG. 7, and the projections 200, 200 of the structure of FIG. 8 are substantially equivalents. These projections and the pole-gap-forming edges thereof have a length which is equal to the spacing between the top and bottom plates, i.e. the spacing between parts 31′, 32′ in FIG. 6, the spacing between parts 41′, 42′ in FIG. 7 and the spacing between the web portions of channel elements 51′ of FIG. 8. The playback heads shown in FIGS. 6 to 8, inclusive, have a minimum height for a given width of recording tape or, in other words, are very compact. The magnetic gaps of the structures of FIGS. 6 to 8 have a different circular pitch, that of gaps 65 of FIG. 6 being 180 degrees, that of gaps 46′ of FIG. 7 being 120 degrees and that of gaps 53′ of FIG. 8 being 90 degrees. In all embodiments of the invention shown the width of pole-piece-forming projections is but a fraction of the circular pitch between pole gaps. The edges formed between the end plates of the magnetic core structure and their bent pole-piece-forming projections are the points of maximum spacing between the playback-head-supporting shaft and any constituent portion of said end plates, or top and bottom plates. All other edges laterally bounding said top and bottom plates have a smaller spacing from said shaft than the edges formed between the top and bottom plates and the pole-piece-forming projection thereof. Referring, for instance, to FIG. 6, the spacing of the edges formed between parts 31′ and 34′, or between parts 32′ and 35′ from the center of core 33′ or from the center of head-supporting shaft, respectively, is equal to half of the length of parts 31′, or 32′. The distance of the lateral edges of parts 31′ and 32′ from the above centers is much less than half of the length of parts 31′ and 32′. This geometry is important to minimize leakage flux in the playback head. The structures of FIGS. 7 and 8 are designed in a fashion similar to that of FIG. 6 to minimize leakage flux in the respective playback head. Referring to FIG. 7, it will be apparent that the edges formed between parts 41′, 44′ and parts 42′, 45′ have the maximum spacing from the center of the device. All other edges laterally bounding plates 41′, 42′ are substantially convex and thus have a smaller spacing from the center of the device than the edges formed between parts 41′, 44′ and parts 42′, 45′. It will be also apparent from FIGS. 6 to 8, inclusive, that no portions of the top and bottom plates other than those forming the pole pieces 34′, 35′; 44′, 45′ and 200, 200 are bent 90 degrees out of the general planes of the top and bottom plates. This is important in order to minimize the height of, and the leakage flux within, the playback head.

It will also be apparent from FIG. 8 that the projections 200 have curved surfaces which are not coaxial with the toroidal coil 68. The curved cylindrical surfaces of projections 200 have axes of curvature arranged eccentrically with respect to the axis of coil 68, and with respect to the playback-head-supporting shaft 2′.

Figure 9:
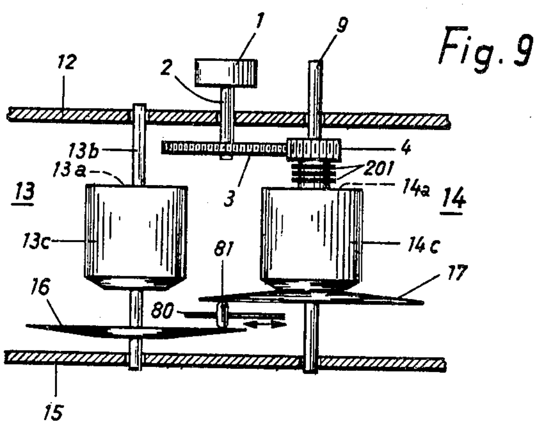
FIG. 9 is a side elevation of drive means for a rotatable multiple magnetic playback head and for magnetic tape with a sound track thereon.

Referring now to FIG. 9, numeral 1 has been applied to indicate a rotatable multiple playback head such as illustrated in FIGS. 1*a* to 8, inclusive. Head 1 is supported by head shaft 2 mounted on frame plate 12. Head shaft 2 is operated by gears 3, 4 of which the latter forms an integral part of the rotatable stator 14*a* of motor 14. Motor 14 comprises in addition to the part 14*a* referred to as the stator, a part 14*c* referred to as the rotor of motor 14. Motor 14 may be a synchronous motor, or an asynchronous motor. It must, however, be a motor of the type wherein the relative angular velocity between rotor 14*c* and stator 14*a* is fixed, or constant. As mentioned above, stator 14*a* operates playback head 1 by the intermediary of gears 3, 4. Rotor 14*c* is mounted on shaft 9 for operating a tape-advancing capstan (see FIG. 1). Motor 13 is substantially identical to motor 14, except that the former comprises but one part rotatable relative to frame or chassis 12, 15, i.e. the rotor 13*c*. Rotor 13*c* and rotor 14*c* are each fixedly coupled with a friction disk 16 and 17, respectively. Shaft 80 supporting roller 81 is arranged at right angles to shafts 13*b* and 9, and adapted to be shifted selectively either to the left, or to the right, as indicated by arrows in FIG. 9. The rotation of the rotor 13*c* of motor 13 is transmitted by means of friction gears 16, 81 and 17 to the rotor 14*c* of motor 14. Friction gears 16, 81 and 17 permit a continuous variation of gear ratio, and hence of the speed, superimposed by rotor 13*c* of auxiliary motor 13 upon the rotor 14*c* of main motor 14.

The structure of FIG. 10 is substantially identical with that of FIG. 9 and the same reference characters have been applied in both figures to indicate like parts. FIG. 10 differs from FIG. 9 only inasmuch as the transmission between parts 16 and 17 is concerned. FIG. 10 shows a shaft 18 at right angles to shafts 12*b* and 13*b* supporting friction rollers 19 and 20, of which one engages friction disc 16 and the other friction disc 17. Shaft 18 is supported by lever 21 movable selectively to the left or right, as indicated by arrows 22, 23 whereby the gear ratio may continuously be varied at will.

Figure 11:
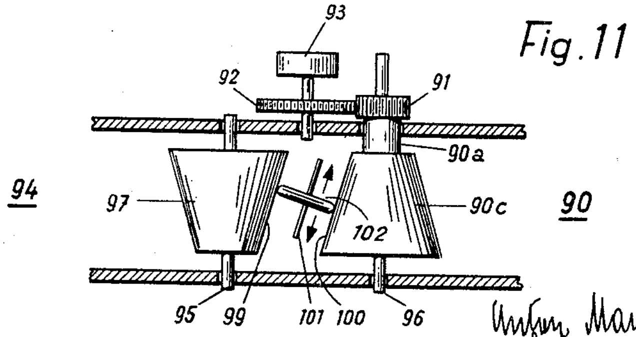
FIG. 11 is a side elevation of a modification of the structures shown in FIGS. 9 and 10.

The structure shown in FIG. 11 is substantially identical to the structure shown in FIGS. 9 and 10 and, therefore, needs to be described only to the extent to which it differs from the structures illustrated in the last referred to figures. The motor 90 shown in FIG. 11 comprises a stator 90*a* and a rotor 90*c*. Gear 91 forms an integral part of stator 90*a* and drives gear 92 on the shaft of which the rotatable multiple magnetic playback head 93 is mounted. The rotor 90*c* of motor 90 has a driving shaft 96 by which a tape advancing capstan (not shown) is supposed to be driven. The shaft 95 of an auxiliary motor generally indicated by numeral 94 is arranged parallel to the shaft 96 of main motor 90. Reference numeral 97 has been applied to indicate a surface in the shape of an inverted truncated cone forming an integral part of the rotor of motor 94. The rotor 90*c* of motor 90 is in the shape of an identical truncated cone, i.e. an identical truncated cone surface forms an integral part of the rotor 90*c* of motor 90. Truncated cone surfaces 97 and 90 are arranged in such a way as to have a pair of parallel generating lines 99 and 100, respectively, at the juxtaposed sides thereof. Shaft 101 is mounted parallel to generating lines 99 and 100, and equally spaced from each of these lines. Friction wheel 102 is in frictional engagement with both truncated cones 97 and 90*c*, and transmits power from the rotor of motor 94 to the rotor of motor 90. Parts 97, 102 and 90*c* form a continuous variable speed drive enabling to control at will the velocity of capstan operating shaft 96 by shifting friction gear 102 either upwardly, or downwardly, as indicated by the two arrows in FIG. 11.

Referring now back to FIG. 1, it will be apparent that there is a predetermined portion of the cylindrical periphery of playback head 1 which is being engaged by magnetic tape 5. Magnetic tape 5 must never be in engagement with more than two pairs of adjacent poles, i.e. with not more than two pole gaps. The angle along which the tape engages the cylindrical surface of the rotatable multiple playback head must not be substantially less than the angle enclosed between adjacent pole gaps. It has been found that if the magnetic playback head has four pairs of poles, and consequently four pole gaps, the angle along which the tape engages the cylindrical surface of the rotatable multiple playback head should preferably be 86 degrees. This has been indicated in FIG. 8 where reference numeral 5' has been applied to indicate the magnetic tape having a sound track thereon and reference numeral 71 has been applied to indicate the cylindrical tape-guiding surface of the multiple playback head.

The motors used to drive the magnetic playback head and the tape advancing capstan are provided with slip rings to connect the motors to a suitable source of power. FIGS. 1, 9 and 10 indicate slip rings 201 forming an integral part of the main motor. In a similar way the rotatable multiple magnetic playback head proper must be supplied with slip rings which have not been shown in the drawings. The auxiliary motors 13 of FIGS. 1, 9 and 10 do not require slip rings. The same is true in regard to motor 94 of FIG. 11. Motor 90 of FIG. 11 requires slip rings not shown in this figure.

While in accordance with the patent statutes, I have disclosed the details of several preferred embodiments of my invention, it is to be understood that many of these details are merely illustrative and variations in their precise form will be possible or necessary depending upon the particular nature of application. I desire, therefore, that my invention be limited only to the extent set forth in the appended claims and by the prior art.

I claim as my invention:

1. A sound reproducing system adapted to control playback speed comprising a driving shaft, a toroidal magnet coil arranged substantially coaxially with respect to said shaft, a magnetic core structure supported by said shaft supporting said coil, said core structure including a core member arranged inside said coil substantially coaxially with respect to said shaft, a plurality of substantially channel-shaped magnetic elements, web portions of said plurality of elements engaging the upper and lower ends of said core member and flange portions of said plurality of elements being arranged radially outwardly from said core member and spaced to form a system of relatively narrow gaps and to form a system of relatively wide gaps each situated between two of said system of relatively narrow gaps, said flange forming a plurality of spaced magnet poles situated in a cylindrical surface substantially coaxial to said coil and extending parallel to said shaft, and a magnetic tape having a sound track thereon positioned in a surface parallel to said shaft and wound in a direction longitudinally thereof around a predetermined portion of the periphery of said cylindrical surface wherein said magnet poles are arranged.

2. In a sound reproducing system adapted to control playback speed the combination of a driving shaft; a toroidal magnet coil arranged substantially coaxially with respect to said shaft; a magnetic core structure supported by said shaft supporting said coil, said core structure including a core member arranged inside said coil substantially coaxially with respect to said shaft, said core structure further including a first system of angularly displaced channel elements juxtaposed with the web portions thereof to one of the end surfaces of said coil and overlapping with the flange portions thereof the lateral surface of said coil, said core structure further including a second system of angularly displaced channel elements juxtaposed with the web portions thereof to the other of the end surfaces of said coil and overlapping with the flange portions thereof said lateral surfaces of said coil, said first system of channel elements and said second system of channel elements being angularly displaced to each other and said flange portions of said first system and said flange portion of said second system defining a plurality of narrow magnetic gaps; and a magnetic tape having a sound-track thereon position in a surface parallel to said shaft and wound in a longitudinal direction around a portion of said lateral surface of said coil.

3. A multiple recording and playback head for sound recording and reproducing systems comprising a plurality of parts arranged within and bounding a cylindrical space defined by an upper end plane, a lower end plane parallel to said upper end plane and a lateral cylindrical boundary surface forming an upper circular edge at the locus of intersection thereof with said upper end plane and forming a lower circular edge at the locus of intersection thereof with said lower end plane, said plurality of parts including a shaft coextensive with the axis of said space; a toroidal magnet coil arranged substantially coaxially with respect to said shaft; and a magnetic core structure supported by said shaft supporting said coil, said core structure including a core member arranged inside said coil substantially coaxially with respect to said shaft; said core structure further including a first plurality of arms extending radially outwardly from the region of said shaft, having a predetermined circular pitch, being arranged in said upper end plane and having lateral edges generally spaced from said upper circular edge; a second plurality of arms extending radially outwardly from the region of said shaft, having a predetermined circular pitch, being arranged in said lower end plane and having lateral edges generally spaced from said lower circular edge; said first plurality of arms and said second plurality of arms being congruent and angularly displaced relative to each other; the radially outer end of each of said first plurality of arms being approximately coextensive with a portion of said upper circular edge and the radially outer end of each of said second plurality of arms being approximately coextensive with a portion of said lower circular edge; the radially outer end of each arm of said first plurality of arms and the radially outer end of each arm of said second plurality of arms being provided with an integral pole projection arranged approximately in said lateral boundary surface; the pole projections of said first plurality of arms and the pole projections of said second plurality of arms having edges situated approximately in said lateral boundary surface and adapted to define a cyclic pattern of narrow gaps and of gaps having a width in the order of said circualr pitch of said first plurality of arms and of said second plurality of arms.

4. A multiple recording and playback head as specified in claim 3, wherein said pole projection of each of said first plurality of arms and of each of said second plurality of arms has a curved surface having an axis of curvature arranged eccentrically with respect to said shaft and slightly deviating from said lateral boundary surface.

5. A multiple recording and playback head for sound recording and reproducing systems comprising a plurality of parts arranged within and bounding a cylindrical space defined by an upper end plane, a lower end plane parallel to said upper end plane and a lateral cylindrical boundary surface forming an upper circular edge at the locus of intersection thereof with said upper plane and forming a lower circular edge at the locus of intersection thereof with said lower end plane, said plurality of parts including a shaft coextensive with the axis of said space; a toroidal magnet coil arranged substantially coaxially with respect to said shaft and jointly rotatable with said shaft; and a magnetic core structure supported by and jointly rotatable with said shaft; said core structure including a core member arranged inside said coil; said core structure further including a first plurality of arms extending radially outwardly from the region of said shaft, enclosing equal predetermined angles, being arranged in said upper end plane and having lateral edges generally spaced from said upper circular edge; a second plurality of angularly displaced arms extending radially outwardly from the region of said shaft, enclosing equal predetermined angles, being arranged in said lower end plane and having lateral edges generally spaced from said lower circular edge; said first plurality of arms and said second plurality of arms being congruent and being angularly displaced from each other; the radially outer end of each arm of said first plurality of arms being provided with an integral pole projecting bent about 90 degrees out of said upper end plane and the radially outer end of each arm of said second plurality of arms being provided with an integral pole projection bent about 90 degrees out of said lower end plane; each pole projection of said first plurality of arms and each pole projection of said second plurality of arms having pole-surface-forming edges equal in length to the entire spacing between said upper end plane and said lower end plane and defining a cyclic system of pole gaps.

6. A multiple sound recording and sound playback head comprising a plurality of parts arranged within and bounding a cylindrical space defined by an upper end plane, by a lower end plane parallel to and having a predetermined spacing from said upper end plane and by a lateral cylindrical boundary surface forming an upper circular edge at the locus of intersection thereof with said upper end plane and forming a lower circular edge at the locus of intersection thereof with said lower end plane, said plurality of parts including a shaft coextensive with the axis of said space; a toroidal magnet coil arranged substantially coaxially with respect to, and jointly rotatable with, said shaft; and a magnetic core structure supported by and jointly rotatable with said shaft, said core structure including a core member arranged inside said coil, said core structure further including a first plurality of arms extending radially outwardly from the region of said shaft, having a predetermined circular pitch, being arranged in said upper end plane and having lateral edges generally spaced from said upper circular edge; a second plurality of arms extending radially outwardly from the region of said shaft, having a predetermined circular pitch equal to said first mentioned circular pitch, being arranged in said lower end plane and having lateral edges generally spaced from said lower circular edge; said first plurality of arms and said second plurality of arms having a predetermined angular displacement, and the radially outer ends of the constituent arms of said first plurality of arms and the radially outer ends of the constituent arms of said second plurality of arms being provided with integral pole projections being arranged substantially in said lateral boundary surface; said pole projections having edges adapted to define a cyclic pattern of narrow and wide pole gaps substantially equal in length to said spacing between said upper plane and said lower plane, and the width of said wide pole gaps being approximately equal to said circular pitch.

7. A multiple sound recording and playback head comprising a plurality of parts arranged within and bounding a cylindrical space defined by an upper end plane and a parallel lower end plane spaced from said upper end plane and by a cylindrical boundary surface intersecting with said upper end plane along an upper circular edge and intersecting with said lower end plane along a lower circular edge, said plurality of parts including a driving shaft coextensive with the axis of said space; a toroidal magnet coil arranged coaxially with respect to said shaft and jointly rotatable with said shaft; a magnetic core structure supported by and jointly rotatatble with said shaft; said core structure including means defining a flux path inside said coil; said core structure further including a top plate arranged in said upper end plane and having edge portions receding from said upper circular edge to define a plurality of upper arms extending radially outwardly from the region of said shaft and having a predetermined circular pitch; said core structure including a bottom plate arranged in said lower end plane and having edge portions receding from said lower circular edge to define a plurality of lower arms extending radially outwardly from the region of said shaft and having the same circular pitch as said plurality of upper arms; the radially outer ends of said plurality of upper arms being substantially coextensive with portions of said upper circular edge and the radially outer ends of said plurality of lower arms being substantially coextensive with said lower circular edge; each constituent arm of said plurality of upper arms and each constituent arm of said plurality of lower arms being provided with an integral pole projection enclosing an angle of 90 degrees with said upper end surface and with said lower end surface; the pole projections of said plurality of upper arms and the pole projections of said plurality of lower arms having edges parallel to said shaft situated approximately in said lateral boundary surface and being adapted to define a cyclic pattern of relatively narrow axial pole gaps and of relatively wide axial pole gaps, and said wide axial pole gaps being approximately equal in width to the extent of said circular pitch.

8. A sound reproducing system adapted to control playback speed comprising a driving shaft, a toroidal magnet coil arranged substantially coaxially with respect to said shaft, a magnetic core structure supported by said shaft supporting said coil, said core structure including a first plurality of angularly spaced magnetic arms situated above said coil extending from points adjacent said shaft substantially radially outwardly to points remote from said shaft, a second plurality of angularly spaced magnetic arms situated below said coil extending from said points adjacent said shaft substantially radially outwardly to points remote from said shaft and angularly displaced with respect to said first plurality of arms, magnetic path means situated inside said coil providing a magnetic connection between said first plurality of arms and said second plurality of arms, each of said first plurality of arms and each of said second plurality of arms comprising a pole piece arranged outside said coil substantially in a cylindrical surface coaxial with respect to said shaft and each said pole piece having a leading and a trailing pole-surface-forming edge parallel to said shaft and equal in length to the axial spacing of said first plurality of arms from said second plurality of arms, and a magnetic tape having a sound track thereon positioned in a surface parallel to said shaft and wound in a direction longitudinally thereof to engage said cylindrical surface along a predetermined angle less than 360 degrees.

9. A sound reproducing system as specified in claim 8 comprising a body of non-magnetic material wherein said coil and said core structure are embedded, said body having a cylindrical surface around which said tape is wound, enveloping said leading and said trailing edge of each said pole piece.

10. A sound reproducing system adapted to control playback speed comprising a driving shaft, a toroidal magnet coil arranged substantially coaxially with respect to said shaft, a magnetic core structure supported by said shaft supporting said coil, said core structure including a core member arranged inside said coil substantially coaxially with respect to said shaft, a first plurality of angularly spaced magnetic arms having a predetermined geometrical configuration in engagement with the top surface of said core member extending radially outwardly therefrom, a second plurality of angularly spaced magnetic arms having the same predetermined geometrical configuration as said first plurality of arms in engagement with the bottom surface of said core member and extending radially outwardly therefrom, said second plurality of arms being angularly displaced in regard to and out of registry with said first plurality of arms, each of said first plurality of arms and each of said second plurality of arms being provided with a pole piece situated outside said coil substantially in a cylindrical surface coaxial to the outer surface of said coil and each having a leading and a trailing pole-surface-forming edge parallel to said shaft and equal in length to the axial spacing of said first plurality of arms from said second plurality of arms, and a magnetic tape having a sound track thereon positioned in a surface parallel to said shaft and wound in a direction longitudinally thereof around a predetermined portion of the periphery of said cylindrical surface.

References Cited in the file of this patent

UNITED STATES PATENTS

| | | |
|---|---|---|
| 2,352,023 | Shuller | June 20, 1944 |
| 2,666,813 | Camras | Jan. 19, 1954 |
| 2,673,248 | Hamberg | Mar. 23, 1954 |
| 2,909,616 | Marty | Oct. 20, 1959 |

FOREIGN PATENTS

| | | |
|---|---|---|
| 1,107,292 | France | Aug. 3, 1955 |
| 760,874 | Great Britain | Nov. 7, 1956 |

UNITED STATES PATENT OFFICE

CERTIFICATE OF CORRECTION

Patent No. 3,047,673 July 31, 1962

Anton M. Springer

It is hereby certified that error appears in the above numbered patent requiring correction and that the said Letters Patent should read as corrected below.

Column 4, line 42, after "stator" insert -- and the rotor of a synchronous motor is constant, and --; column 10, line 11 for "position" read -- positioned --; line 54, for "circualr" read -- circular --; column 11, line 14, for "projecting" read -- projection --.

Signed and sealed this 24th day of December 1963.

(SEAL)
Attest:

EDWIN L. REYNOLDS

ERNEST W. SWIDER
Attesting Officer

Acting Commissioner of Patents